United States Patent
Tao et al.

(10) Patent No.: US 12,394,156 B2
(45) Date of Patent: Aug. 19, 2025

(54) OBJECT POSITIONING METHOD, ELECTRONIC APPARATUS, AND COMPUTER-READABLE STORAGE MEDIUM

(71) Applicant: Nanjing SemiDrive Technology LTD., Nanjing (CN)

(72) Inventors: Sheng Tao, Nanjing (CN); Chunli Li, Nanjing (CN); Hongfeng Zhao, Nanjing (CN); Bin Xiao, Nanjing (CN)

(73) Assignee: NANJING SEMIDRIVE TECHNOLOGY LTD., Nanjing (CN)

( * ) Notice: Subject to any disclaimer, the term of this patent is extended or adjusted under 35 U.S.C. 154(b) by 297 days.

(21) Appl. No.: 18/158,962

(22) Filed: Jan. 24, 2023

(65) Prior Publication Data
US 2024/0029362 A1  Jan. 25, 2024

(30) Foreign Application Priority Data
Jul. 21, 2022  (CN) .......................... 202210863847.7

(51) Int. Cl.
*G06T 19/00* (2011.01)
*G06T 7/20* (2017.01)

(52) U.S. Cl.
CPC .............. *G06T 19/003* (2013.01); *G06T 7/20* (2013.01)

(58) Field of Classification Search
CPC .................................................. G06T 19/003
See application file for complete search history.

(56) References Cited

U.S. PATENT DOCUMENTS

| | | | | |
|---|---|---|---|---|
| 10,395,117 B1* | 8/2019 | Zhang | ..................... | G06V 20/58 |
| 11,360,216 B2* | 6/2022 | Atalla | ..................... | G01S 17/86 |
| 11,501,527 B2* | 11/2022 | Zhang | ..................... | G06T 7/74 |
| 11,573,325 B2* | 2/2023 | Huber | ..................... | G01S 17/89 |
| 11,774,983 B1* | 10/2023 | Zhang | .................. | G05D 1/0253 701/28 |
| 11,940,277 B2* | 3/2024 | Roumeliotis | .......... | G01C 21/28 |
| 11,953,910 B2* | 4/2024 | Zhang | .................. | G05D 1/0272 |

(Continued)

OTHER PUBLICATIONS

The European Patent Office (EPO) the Extended European Search Report for 23165543.2 Dec. 14, 2023 11 Pages.
(Continued)

*Primary Examiner* — Michael A Berns
(74) *Attorney, Agent, or Firm* — ANOVA LAW GROUP, PLLC

(57) ABSTRACT

An object positioning method includes obtaining an environment image collected by a target object through a camera of the target object and a camera parameter of collecting the environment image, determining candidate position information of the target object and a virtual camera parameter, rendering, based on a predetermined three-dimensional model, the candidate position information, and the virtual camera parameter, to generate a rendered image corresponding to the candidate position information, and determining position information of the target object based on the environment image, the rendered image, and the candidate position information. The virtual camera parameter and the camera parameter of the environmental image have a first correspondence. The three-dimensional model and a real space have a second correspondence.

20 Claims, 5 Drawing Sheets

(56) References Cited

U.S. PATENT DOCUMENTS 12,158,344 B2 * 12/2024 Zhang ................. G05D 1/0274
2024/0029362 A1 * 1/2024 Tao ....................... G06T 19/003

OTHER PUBLICATIONS

Vishisht.Gupta, Vehicle localization using low-accuracy GPS, IMU and map-aided vision. The Pennsylvania State University, 2009.
Renato F. Salas-Moreno et al. "Slam++: Simultaneous localisation and mapping at the level of objects." Proceedings of the IEEE conference on computer vision and pattern recognition. 2013.
Maya Dawood et al. "Virtual 3D city model as a priori information source for vehicle localization system." Transportation Research Part C: Emerging Technologies 63 (2016): 1-22.

* cited by examiner

OBJECT POSITIONING METHOD, ELECTRONIC APPARATUS, AND COMPUTER-READABLE STORAGE MEDIUM

CROSS-REFERENCE TO RELATED APPLICATION

The present disclosure claims priority to Chinese Patent Application No. 202210863847.7, filed on Jul. 21, 2022, the entire content of which is incorporated herein by reference.

TECHNICAL FIELD

The present disclosure generally relates to the object positioning technology field and, more particularly, to an object positioning method, an electronic apparatus, and a computer-readable storage medium.

BACKGROUND

With the development of intelligent driving technology, more and more intelligent functions are developed for vehicles or robots. Many intelligent functions for vehicles or robots rely on accurately positioning the vehicles or robots in real time. That is, the vehicles or robots need to be accurately positioned on the road in order to implement the intelligent functions of the vehicles and robots.

However, since the sensors carried by the vehicle or the robot may not obtain the environment information or the obtained environment information is inaccurate, the vehicle or the robot cannot be accurately positioned. Thus, the positioning reliability of the vehicle or the robot is reduced.

SUMMARY

Embodiments of the present disclosure provide an object positioning method. The method includes obtaining an environment image collected by a target object through a camera of the target object and a camera parameter of collecting the environment image, determining candidate position information of the target object and a virtual camera parameter, rendering, based on a predetermined three-dimensional model, the candidate position information, and the virtual camera parameter, to generate a rendered image corresponding to the candidate position information, and determining position information of the target object based on the environment image, the rendered image, and the candidate position information. The virtual camera parameter and the camera parameter of the environmental image have a first correspondence. The three-dimensional model and a real space have a second correspondence.

Embodiments of the present disclosure provide an electronic apparatus, including a processor and a memory. The memory is communicatively coupled to the processor and stores instructions that, when executed by the processor, cause the processor to obtain an environment image collected by a target object through a camera of the target object and a camera parameter of collecting the environment image, determine candidate position information of the target object and a virtual camera parameter, render, based on a predetermined three-dimensional model, the candidate position information, and the virtual camera parameter, to generate a rendered image corresponding to the candidate position information, and determine position information of the target object based on the environment image, the rendered image, and the candidate position information. The virtual camera parameter and the camera parameter of the environmental image have a first correspondence. The three-dimensional model and a real space have a second correspondence.

Embodiments of the present disclosure provide a non-transitory computer-readable storage medium. The storage medium stores computer instructions that, when executed by a processor, cause the processor to obtain an environment image collected by a target object through a camera of the target object and a camera parameter of collecting the environment image, determine candidate position information of the target object and a virtual camera parameter, render, based on a predetermined three-dimensional model, the candidate position information, and the virtual camera parameter, to generate a rendered image corresponding to the candidate position information, and determine position information of the target object based on the environment image, the rendered image, and the candidate position information. The virtual camera parameter and the camera parameter of the environmental image have a first correspondence. The three-dimensional model and a real space have a second correspondence.

The present disclosure provides the object positioning method, the electronic apparatus, and the computer-readable storage medium. The environment image collected by the target object through the camera of the target object and the camera parameter of collecting the environment image can be obtained. The candidate position information of the target object and the virtual camera parameter can be determined. The virtual camera parameter and the camera parameter of the environment image can have the first correspondence. Based on a predetermined three-dimensional model, the candidate position information, and the virtual camera parameter, rendering can be performed to generate the rendered image corresponding to the candidate position information. The three-dimensional model and the real space can have a second correspondence. The position information of the target object can be determined based on the environment image, the rendered image, and the candidate position information. Thus, the rendered image corresponding to the candidate position information can be generated through rendering in the virtual three-dimensional model matching the real space. Then, the rendered image can be matched with the environment image actually captured by the target object to obtain the current accurate position information of the target object. Thus, the target object can be positioned easily and quickly, and requirements for the environment where the target object is located can be low. Compared to obtaining the environment information through various sensors carried on the target object, then using the prior data collected in advance, and calculating the real-time positioning information through matching or image optimization, the method of the present disclosure can be more flexible, and have a broader application scope, e.g., can be used in severe conditions such as tunnels, bridge-tunnels, etc.

The above description is merely an overall description of the technical solution of the present disclosure. To understand the technical solutions of the present disclosure in detail and implement the content in the specification, and to cause the above and other objectives, features, and advantages of the present disclosure more understandable, some embodiments of the present disclosure are described exemplarily below.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

In order to make the objectives, technical solutions, and advantages of embodiments of the present disclosure clearer, the technical solutions of embodiments of the present disclosure are described in detail below with reference to the accompanying drawings of embodiments of the present disclosure. All other embodiments obtained by those skilled in the art based on embodiments of the present disclosure without creative efforts shall be within the scope of the present disclosure.

Figure 1:
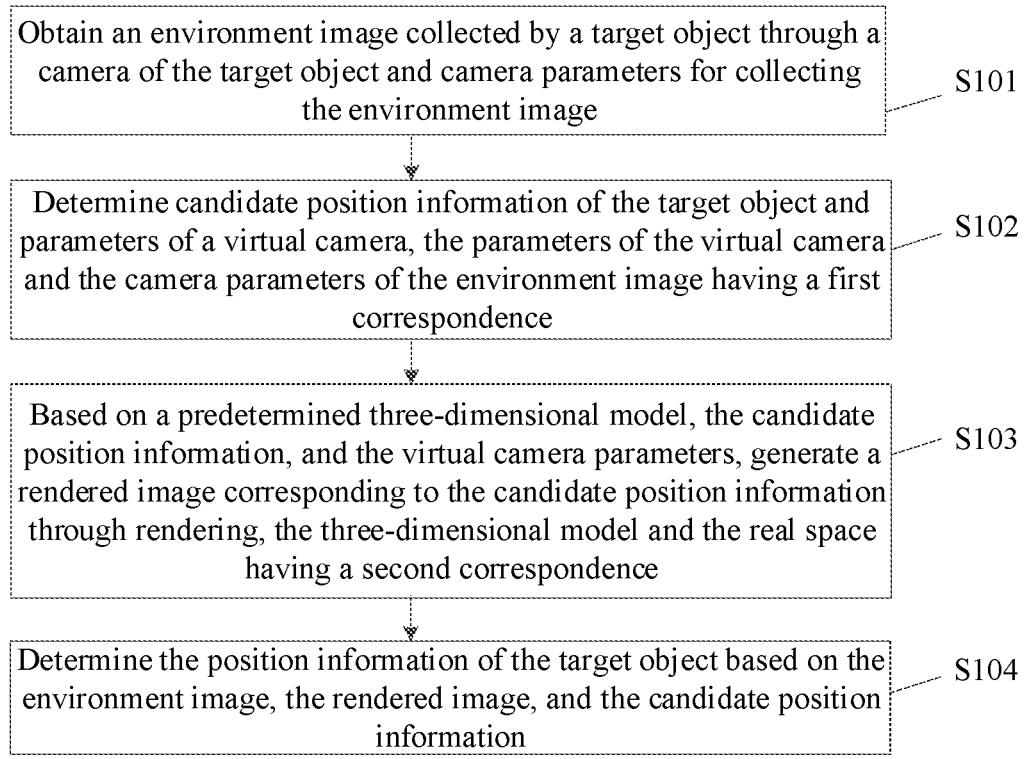
FIG. 1 illustrates a schematic flowchart of an object positioning method according to some embodiments of the present disclosure.

Embodiments of the present disclosure provide an object positioning method, which can be applied to scenarios such as vehicle positioning on a road, robot indoor positioning, etc. As shown in FIG. 1, the object positioning method includes the following processes.

At S101, an environment image collected by a target object through a camera of the target object and camera parameters for collecting the environment image are obtained.

In some embodiments, the target object can include but is not limited to a vehicle, a robot, and an intelligent unmanned vehicle.

In some embodiments, cameras can be arranged in a plurality of directions of the target object and be configured to collect images of a surrounding environment in real time. One, several, or all images collected by the cameras can be used as the environment image collected by the target object and can be used to calculate the positioning of the target object. When the environment image is collected, the camera parameters can be recorded in real-time when the environment image is collected. The camera parameters can include but are not limited to a photographing angle, a field of view size, etc.

At S102, candidate position information of the target object and parameters of a virtual camera are determined, and the parameters of the virtual camera and the camera parameters of the environment image have a first correspondence.

In some embodiments, candidate position information of the target object can include one or more candidate positions. Each candidate position can correspond to a parameter of one virtual camera. The virtual camera is a camera assumed in the virtual space corresponding to the real space where the target object is located. The parameters of the virtual camera and the camera parameters of the environmental image can have a first correspondence. However, a size of the parameter can be same or different. The parameters of the virtual camera can include but is not limited to a photographing angle, a field size, etc.

In some embodiments, determining the candidate position information of the target object can include obtaining the position information of the target object at a first moment, the first moment being a moment before a current moment, and determining the candidate position information of the target object based on the position information of the first moment. That is, the candidate position information of the target object can be obtained by performing an estimation based on the position information of the target object before the current moment.

In some embodiments, determining the candidate position information of the target object based on the position information at the first moment can include obtaining first movement speed information of the target object, calculating a movement distance of the target object based on the first movement speed information and time difference information between the current moment and the first moment, and predicting the position information of the target object at the current moment as the candidate position information of the target object based on the position information of the first moment and the movement distance of the target object.

Figure 2:
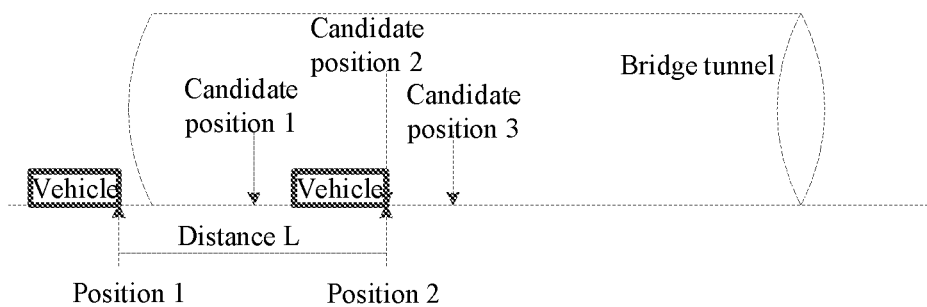
FIG. 2 illustrates a schematic diagram of an application scenario according to some embodiments of the present disclosure.

For example, as position 1 shown in FIG. 2, before the target object, such as the vehicle, enters a bridge-tunnel, that is, the first moment, the position information of the target object is calculated by a global navigation satellite system carried by the target object. After the vehicle enters the tunnel, a global navigation satellite signal disappears, and the position information of the vehicle at the current moment cannot be calculated through the global navigation satellite system. However, the candidate position information of the vehicle can be predicted based on the position information of the first moment. Firstly, the movement distance L from the first moment to the current moment of the vehicle can be calculated. The movement distance L can be calculated according to the first moving speed information of the vehicle and the time difference information of the current moment and the first moment. Thus, the position of the vehicle at the current moment can be predicted to be near position 2. Position 2 can be a position after position 1 at the first moment moves forwards for the moving distance L along the road. According to positioning accuracy, one or more target positions can be selected near position 2 as the candidate position information of the vehicle, e.g., candidate position 1, candidate position 2, and candidate position 3 shown in FIG. 2.

In some embodiments, by obtaining the position information of the target object at the first moment, the candidate position information of the target object can be predicted based on the position information at the first moment to obtain a small number of candidate positions that match with the position of the target object at the current moment.

In some embodiments, the candidate position of the target object can be directly selected from a virtual space corresponding to the real space, for example, a three-dimensional model corresponding to the real space, to obtain the candidate position information. For example, when the vehicle travels on a road, several target positions can be selected on a virtual road corresponding to the road to be used as the candidate positions to obtain the candidate position information. For another example, when the robot moves indoors, several target positions can be selected in the virtual space corresponding to the indoor space to be used as the candidate positions to obtain the candidate position information.

In some embodiments, the candidate position information of the target object can be determined based on the environmental image. For example, the vehicle can capture an environment image at any time on the driving road. The virtual camera in the virtual space can perform a search based on the environment image. Then, a position determined based on a search result can be used as the candidate position of the target object to obtain the candidate position information. Meanwhile, a virtual camera parameter corresponding to the camera parameter can also be determined, for example, which direction the virtual camera should face, a photographing angle, a field of view, etc.

At S103, based on a predetermined three-dimensional model, the candidate position information, and the virtual camera parameters, a rendered image corresponding to the candidate position information is generated through rendering, the three-dimensional model and the real space having a second correspondence.

In some embodiments, the three-dimensional model can be the virtual space corresponding to the real space. The three-dimensional model and the real space can have a second correspondence. In the second correspondence considering the size, the three-dimensional model and the real space can be in a one-to-one correspondence or can have a smaller ratio, for example, in a one-to-ten correspondence. In the second correspondence considering the content, the three-dimensional model can correspond to the real space completely or incompletely. For example, the three-dimensional model may not include the sky and a moving object, or may only include a specific area, such as an area corresponding to a viewable range on both sides of the road.

Figure 3:
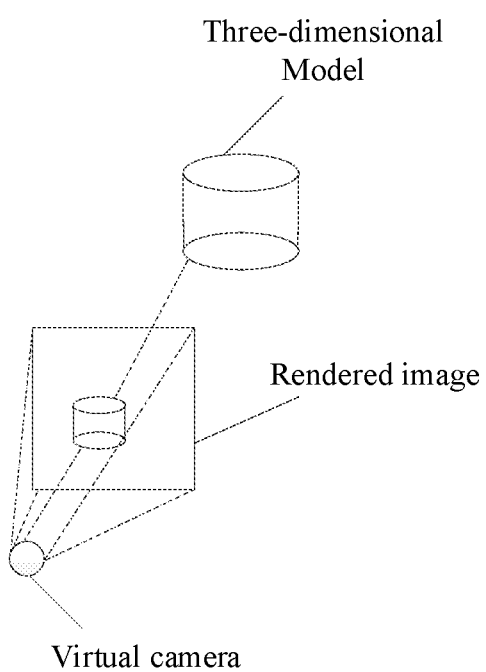
FIG. 3 illustrates a schematic diagram of generating a rendered image according to some embodiments of the present disclosure.

After the candidate position information and the virtual camera parameters are determined, the virtual camera can be arranged at the candidate position in the predetermined three-dimensional model. As shown in FIG. 3, image rendering is performed based on the virtual camera parameters and three-dimensional rendering technology to quickly generate the rendered image corresponding to the candidate position information.

The rendered image can include, but is not limited to, a color picture, a black and white picture, a contour picture, a feature point cloud, etc.

For the construction of the three-dimensional model, in some embodiments, in order to ensure a matching accuracy of the rendered image and the environment image, when the three-dimensional model is created, a dynamic object, such as a moving pedestrian, vehicle, etc., needs to be removed to prevent interference of the information from being imposed on the matching of the images.

In some embodiments, to reduce a three-dimensional model storage space and increase a three-dimensional model retrieval speed, dynamic model accuracy can be used. For example, for a road scenario with an obvious feature, the model accuracy corresponding to the road can be reduced. For example, in a scenario with a building having a unique shape, the accuracy of other buildings nearby can be reduced. For a scenario with a small difference, and a highway without a specific sign, the model accuracy corresponding to the scenario and the highway needs to be improved. Details of the road and surrounding objects can be recorded to improve matching accuracy. For time-insensitive object information, model accuracy corresponding to the object information can be improved, such as road information, street lamp information, roadside fixed buildings, etc. For time-sensitive object information, such as trees (leaves falling in winter), the sky (obvious changes in the day time and night, cloudy days and sunny days), the model accuracy corresponding to the object information can be reduced.

In some embodiments, the model accuracy can be set to be dynamically updated. For example, when position recognition accuracy of a partial road segment is very high, the road segment can thus have an obvious feature. Thus, the model accuracy corresponding to the road segment can be automatically lowered, or a low-accuracy model can be called (the same position supports models with different accuracies) to perform the image rendering. When the recognition accuracy of the partial road segment is low, and an error of the matching result is large, the model accuracy corresponding to the road segment can be increased, or the high-accuracy model added with the color information or other information can be used to perform the image rendering.

In some embodiments, for different environments, different modeling modes can be used. For example, only mesh information can be used to record the contour information of the object, or the mesh information and image information are used to record the contour and pattern information of the object.

In some embodiments, illumination information can also be recorded in the three-dimensional model.

At S104, the position information of the target object is determined based on the environment image, the rendered image, and the candidate position information.

In some embodiments, the position information of the target object can be determined in an image violent matching manner. For example, in specific positioning accuracy, all rendered images generated according to the candidate position information can be matched with the environment image captured by the target object in real time, respectively, to find candidate position information corresponding to an optimally matched rendered image to be used as the position information of the target object in the real space.

In the object positioning method of embodiments of the present disclosure, by obtaining the environment image collected by the camera of the target object and the camera parameter for collecting the environment image, the candidate position information of the target object and the virtual camera parameters can be determined. The virtual camera parameter and the camera parameter of the environment image can have the first correspondence. Based on the predetermined three-dimensional model, the candidate position information, and the virtual camera parameters, the rendered image corresponding to the candidate position information can be rendered and generated. The three-dimensional model and the real space can have the second correspondence. Based on the environment image, the rendered image, and the candidate position information, the position information of the target object can be determined. Thus, in the virtual three-dimensional model matching the real space, the rendered image corresponding to the candidate position information can be rendered and generated. Then, the rendered image can be matched with the environment image captured by the target object to obtain the current and accurate position information of the target object. Thus, the positioning of the target object can be easily and quickly realized. Moreover, a lower requirement for the environment where the target object is located can be required. Compared to obtaining the environment information through the various sensors arranged at the target object, and using the prior data collected in advance to calculate the real-time positioning information in a matching or image optimization method, the method of embodiments of the present disclosure can be more flexible and have a broader application range. For example, the method can be suitable for severe conditions with weak signals such as a tunnel, a bridge-tunnel, etc.

In some embodiments, if the target object includes a plurality of cameras arranged in different directions, each camera can collect an environmental image. To improve the matching speed of the environment image and the virtual image, after determining the candidate position information of the target object, the object positioning method can further include determining model parameters corresponding to the candidate position information in the three-dimensional model, and selecting, based on the model parameters, the environment image collected by the camera in a target direction and the camera parameter of collecting the environment image to determine the position information of the target object.

In some embodiments, the model parameter can include, but is not limited to, model accuracy, a model feature, and an image mode. The model feature can include a building feature, a road feature, etc. After the model parameters corresponding to the candidate position information are determined in the three-dimensional model, the environment image of the target direction can be selected according to a characteristic of the model parameter. The virtual camera parameter can be determined based on the camera parameter of the environment image in the target direction. Then, image rendering can be performed. The environment image of the target direction can be matched with the rendered image to determine the position information of the target object. For example, when a plurality of cameras are arranged in different directions at the vehicle and collect the environment images in real time, a real-time environment image of a specific angle can be automatically selected according to the model feature of the candidate position. The real-time environment image can be matched with the rendered image in a specific direction. For example, a feature of a building in a direction facing a vehicle tail can be obvious in a certain area. When positioning is performed on the vehicle, the environment image collected by a camera facing the vehicle tail can be automatically called, and the environment images captured by other cameras can be ignored. The camera parameter of the environment image facing the vehicle tail can be used to determine the virtual camera parameter. Then, the image rendering can be performed. The environment image facing the vehicle tail can be matched with the rendered image to determine the position information of the vehicle.

Figure 4:
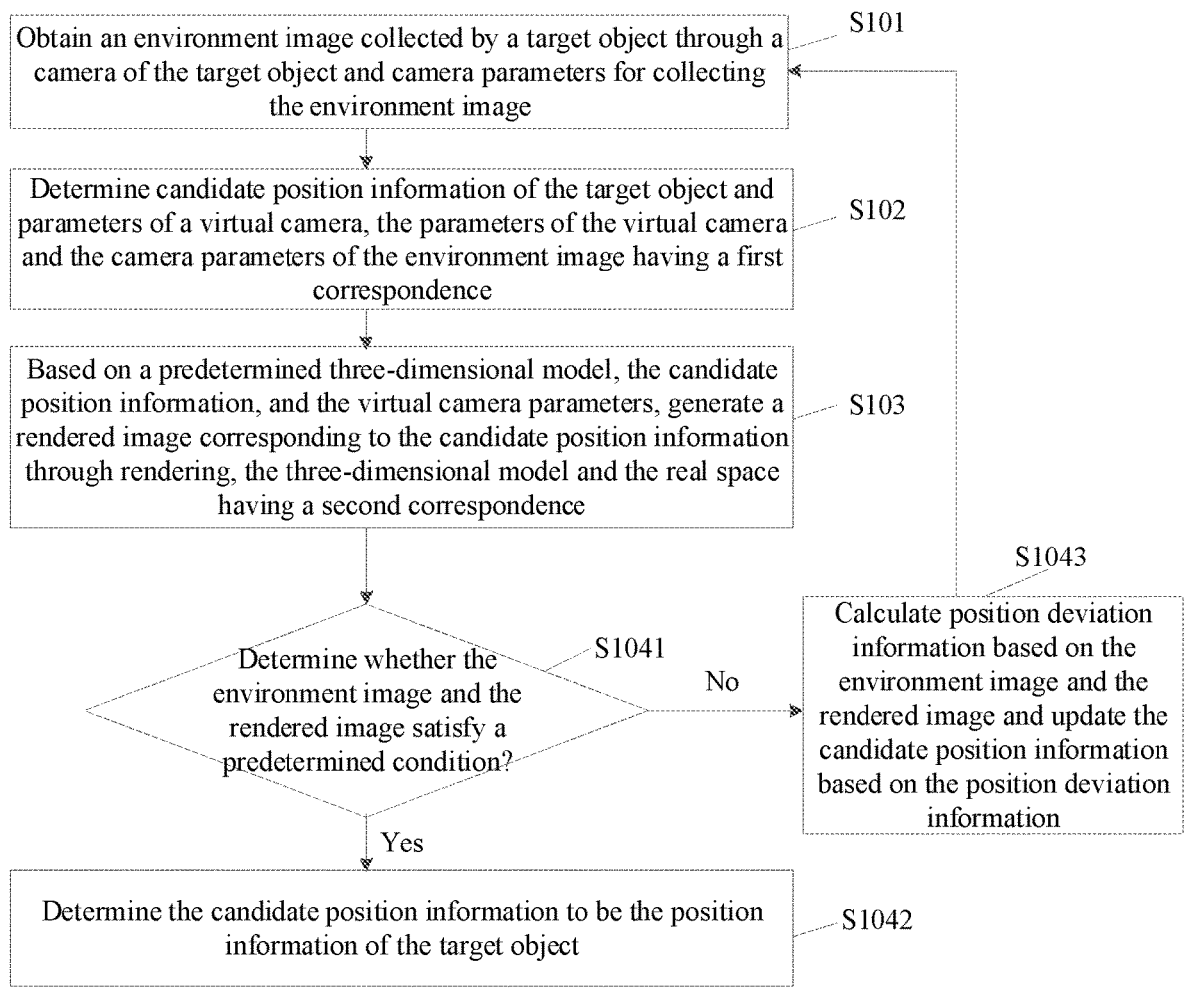
FIG. 4 illustrates a schematic flowchart of a step of an object positioning method according to some embodiments of the present disclosure.

In some embodiments, at S104, the position information of the target object is determined based on the environment image, the rendered image, and the candidate position information. Process S104 shown in FIG. 4 includes the following processes.

At S1041, the environment image is compared with the rendered image to determine whether the environment image and the rendered image meet a preset condition.

In some embodiments, the environment image and the rendered image are compared, and comparison can be performed based on features of the environment image and the rendered image.

In some embodiments, the rendered image can include a color picture, a black-and-white picture, a contour picture, a feature point cloud, etc. Moreover, the rendered image can be generated at a certain model accuracy corresponding to the candidate position. Accuracy of some objects in the obtained rendered image may not be high. The environment image collected by the camera can be generally a color picture. Accuracy of each object in the environment image can be high. Therefore, to more accurately and quickly match the environment image with the rendered image, before comparing the environment image and the rendered image, the object positioning method further can include determining the model parameters corresponding to the candidate position information in the three-dimensional model and processing the environment image based on the model parameters.

Figure 5:
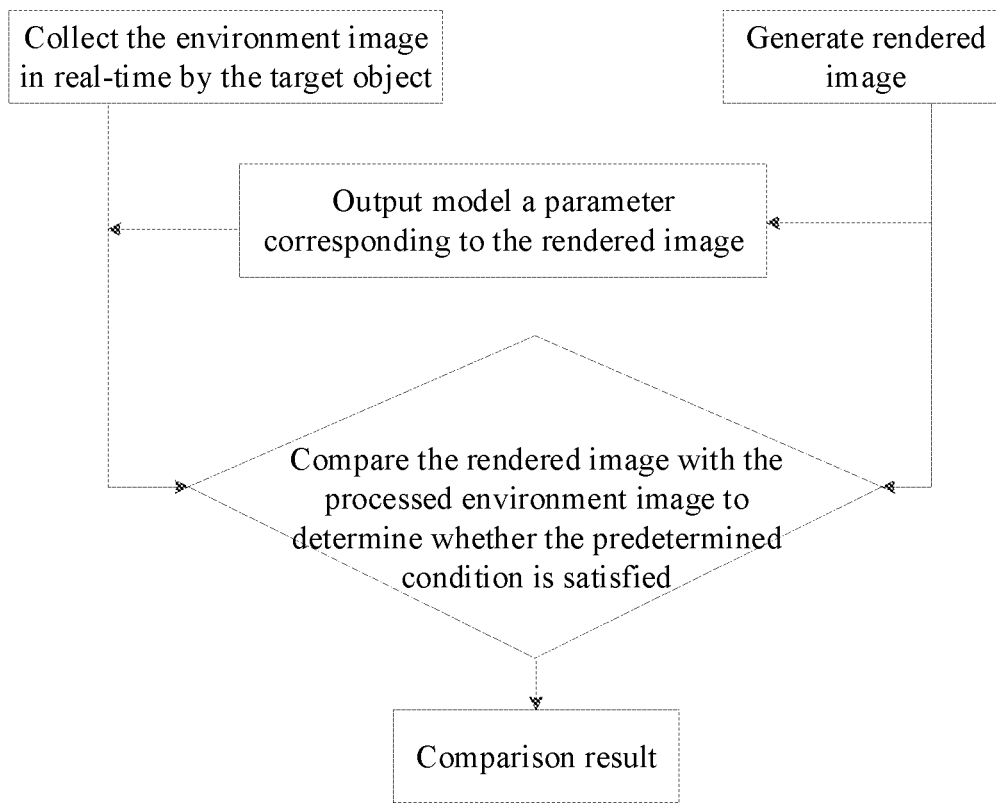
FIG. 5 illustrates a schematic flowchart of processing an environment image based on model parameters according to some embodiments of the present disclosure.

In some embodiments, as shown in FIG. 5, after the rendered image corresponding to the candidate position information is generated, the model parameter corresponding to the candidate position information is output, that is, the model parameter corresponding to the rendered image. The model parameter can include the model accuracy, the image mode. The image mode can include a black- and white image, a contour picture, or a feature point cloud, etc. Then, the environment image can be optimized based on the model parameter. Then, the rendered image can be compared with the processed environment image to determine whether a predetermined condition is satisfied. Then, the comparison result can be output. For example, the rendered image can be a black-and-white image. The model accuracy corresponding to a lower right corner can be high in the rendered image. Thus, during comparison, an image of an area at the lower right corner can be sensitive to a difference. When a difference threshold is calculated, a higher point can be contributed. Thus, the environment image can be processed to be a black-and-white image, the accuracy of the area at the lower right corner can be improved, and the accuracy of other areas of the environment image can be lowered. Thus, when the environment image is compared with the rendered image, the comparison of the areas at the lower right corner can be focused. For another example, an upper half of the rendered image can be the sky with a low model accuracy. Then, when image comparison is performed, the difference threshold of the area can be zero. Then, the accuracy of the upper half area of the environment image can be adjusted to be very low. Thus, when the environment image is compared with the rendered image, the difference comparison cannot be performed on the upper half areas.

At S1042, when the environment image and the rendered image are determined to meet a predetermined condition, the candidate position information is determined to be the position information of the target object.

In some embodiments, the predetermined condition can include that the feature of the environment image and the feature of the rendered image are similar, and a size of the feature of the environment image and a size of the feature of the rendered image are similar. For example, the environment image and the rendered image can have a same typical building. Sizes of the typical building in the environment image and the rendered image can be similar. Thus, the environment image and the rendered image can satisfy the predetermined condition. If the environment image and the rendered image satisfy the predetermined conduction, the candidate position can be determined to be the position of the target object at the current moment.

At S1043, when the environment image and the rendered image are determined to not meet the predetermined condition, position deviation information is calculated based on the environment image and the rendered image. The candidate position information is updated based on the position deviation information. The method returns to obtaining the environment image collected by the target object through the camera of the target object and the camera parameter of collecting the environment image until the environment image and the rendered image are determined to satisfy the predetermined condition. Then, the updated candidate position information is determined to be the position information of the target object.

In some embodiments, when the rendered image and the environment image do not satisfy the predetermined condition after the comparison but have a certain similarity, position deviation information can be calculated as an input for updating the candidate position information to accelerate the matching of the images. For example, if two images have the same typical building, but the building in the captured image is larger, the candidate position information can be indicated to be far away from the typical building compared. The position deviation information can be calculated.

In some embodiments, the position deviation information can include time information of the target object collecting a next frame of environment image, for example, 50 ms. When the candidate position is updated based on the position deviation information, a deviation distance can be calculated based on the position deviation information and the movement speed of the target object. The candidate position information can be updated based on the deviation distance. After the candidate position information is updated based on the position deviation information, the target object can collect an environment image again through the camera of the target object in response to the time information to update the environment image. For example, the position deviation information can be time when the vehicle obtains a next frame of the environment image. In response to the time, the vehicle can re-collect an environment image again through the camera of the vehicle at the time and re-generate a rendered image based on the updated candidate position information to perform matching verification.

In some embodiments, when the rendered image and the environment image do not satisfy the predetermined condition after the comparison and do not have a certain similarity, position deviation information can be randomly determined, or the candidate position can be re-selected to update the candidate position information.

In some embodiments, the position deviation information can be set to include the time information of collecting the next frame of environment image by the target object. Thus, the candidate position information can be quickly updated, and the environment image can be updated.

In some embodiments, the rendered image can be rendered and generated in the virtual space. Thus, the rendered image can be generated very fast. By comparing the environment image and the rendered image, when the environment image and the rendered image do not satisfy the predetermined condition, the environment image and the rendered image can be further updated to determine the position information of the target object with a relatively fast speed. Moreover, the accurate position information of the target object can be obtained.

In some embodiments, although a generation speed of the rendered image is faster, a certain time can be required to generate the rendered image in real time. To improve the image matching speed and a speed of determining the position information of the target object, after determining the position information of the target object based on the environment image, rendered image, and the candidate position information, the object positioning method can further include obtaining second movement speed information of the target object, predicting position information of the target object at a second moment based on the position information and the second movement speed information of the target object as candidate position information at the second moment, the second moment being a moment after the current moment, and rendering and generating a rendered image corresponding to the candidate position information of the second moment based on the predetermined three-dimensional model, the candidate position information at the second moment, and the virtual camera parameter to generate the rendered image corresponding to the candidate position information of the second moment in advance.

For example, based on the current position of the vehicle and the vehicle speed information, a plurality of future possible position points can be predicted as candidate positions, and a plurality of rendered images can be generated in advance. Thus, the plurality of rendered images can be matched with the environment image collected in real time to improve the matching speed.

In some embodiments, since the real space is constantly changing, the three-dimensional space needs to be dynamically updated. Thus, after determining the position information of the target object based on the environment image, the rendered image, and the candidate position information, the object positioning method can further include determining difference information of the three-dimensional model relative to the real space based on the environment image and the rendered image and updating the three-dimensional model based on the difference information.

For example, after the real position of the vehicle is matched according to the environment image collected by the vehicle in real time, if a specific change exists in the scenario, for example, a tree is missing, or a building is newly built, a corresponding model parameter can be dynamically generated and added into the three-dimensional model.

According to embodiments of the present disclosure, the present disclosure further provides an electronic apparatus and a readable storage medium.

Figure 6:
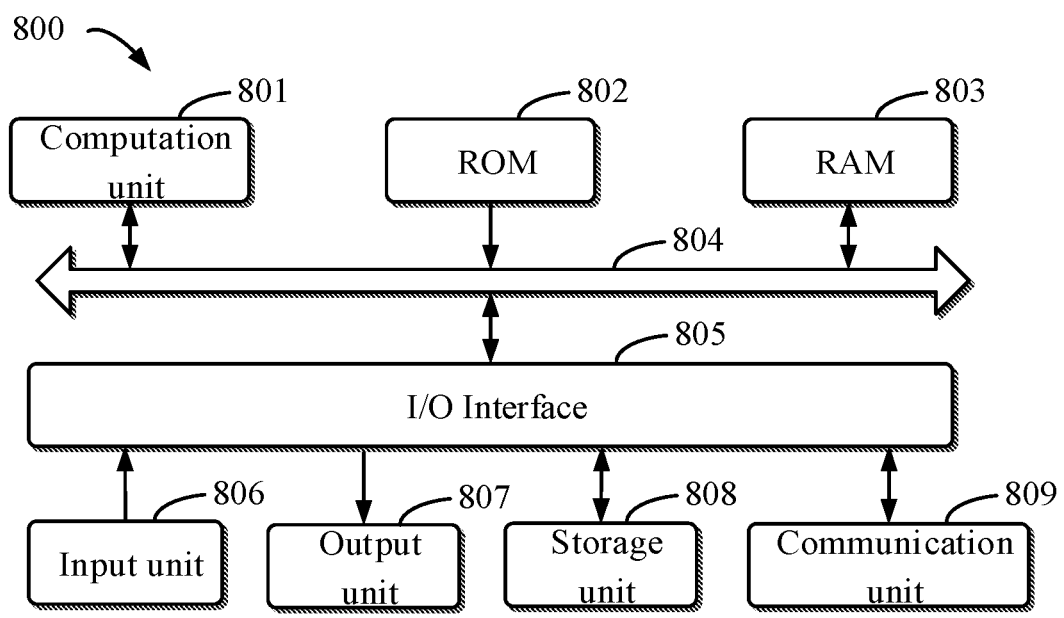
FIG. 6 illustrates a schematic hardware structural diagram of an electronic apparatus according to some embodiments of the present disclosure.

FIG. 6 illustrates a schematic hardware structural diagram of an electronic apparatus 800 according to some embodiments of the present disclosure. The electronic apparatus can include various forms of a digital computer, such as a laptop computer, a desktop computer, a workbench, a personal digital assistant, a server, a blade server, a mainframe computer, and another suitable computer. The electronic apparatus can also include various forms of mobile devices, such as personal digital processing, a cellphone, a smartphone, a wearable apparatus, and another similar computing device. Components, connection and relationship of the components, and functions of the components shown here are merely used as examples and are not intended to limit the present disclosure described here.

As shown in FIG. 6, the apparatus 800 includes a computation unit 801. The computation unit 801 can be configured to perform various suitable actions and processing according to a computer program stored in a read-only memory (ROM) 802 or a computer program loaded into a random access memory (RAM) 803 from a storage unit 808. RAM 803 can also be used to store various programs and data required for operating the apparatus 800. The computing unit 801, the ROM 802, and the RAM 803 are connected to each other through a bus 804. Input/output (I/O) interface 805 is also connected to the bus 804

The plurality of components of the apparatus 800 are connected to the I/O interface 805. The apparatus 800 includes an input unit 806, such as a keyboard, a mouse, etc., an output unit 807, such as various types of displays, speakers, etc., a storage unit 808, such as a magnetic disk, an optical disc, etc., and a communication unit 809, such as a network card, a modem, a wireless communication transceiver, etc. The communication unit 809 can allow the apparatus 800 to exchange information/data with another apparatus through a computer network such as the Internet and/or various telecommunication networks.

The computation unit 801 can include various general and/or special-purposed processing assemblies with processing and computation capabilities. For example, the computation unit 801 can include, but is not limited to, a central processing unit (CPU), a graphics processing unit (GPU), various dedicated artificial intelligence (AI) computation chips, various computation units of running machine learning model algorithms, a digital signal processor (DSP), and any suitable processor, controller, microcontroller, etc. The computation unit 801 can be configured to perform the various methods and processes described above, such as the object positioning method. For example, in some embodiments, the object positioning method can be implemented as a computer software program, which can be tangibly embodied in a machine-readable medium, such as the storage unit 808. In some embodiments, a part or all of the computer program can be loaded and/or installed onto the apparatus 800 via the ROM 802 and/or the communication unit 809. When the computer program is loaded to the RAM 803 and executed by the computation unit 801, one or more steps of the object positioning method described above can be performed. In some other embodiments, the computation unit 801 can be configured to perform the object positioning method in any other suitable manner (e.g., by firmware).

Various system and technology embodiments described here can be implemented in a digital electronic circuit system, an integrated circuit system, a field programmable gate array (FPGA), an application specific integrated circuit (ASIC), a dedicated standard product (ASSP), a system on a chip system (SOC), a complex programmable logic device (CPLD), computer hardware, firmware, software, and/or a combination thereof. These various embodiments can be implemented in one or more computer programs. The one or more computer programs can be executed and/or interpreted at a programmable system including at least one programmable processor. The programmable processor can be a dedicated or universal programmable processor, which can receive data and instructions from a storage system, at least one input device, and at least one output device and transmit the data and instructions to the storage system, the at least one input device, and the at least one output device.

The program codes for implementing the method of the present disclosure can be written in any combination of one or more programming languages. These program codes can be provided to a processor or controller of a general-purpose computer, special-purpose computer, or another programmable data processing device. Thus, when the program codes is executed by the processor or the controller, the functions/operations defined in the flowchart and/or block diagram can be implemented. The program codes can be completely executed on the machine or partially executed on the machine. The program codes can also be used as a stand-alone software package that is partially executed on the machine and partially executed on the remote machine or entirely on the remote machine or server.

In the context of the present disclosure, a machine-readable medium can be a tangible medium that can contain or store a program, which can be used by or in connection with an instruction execution system, device, or apparatus. The machine-readable medium can be a machine-readable signal medium or a machine-readable storage medium. The machine-readable medium can include, but is not limited to, electronic, magnetic, optical, electromagnetic, infrared, or semiconductor systems, devices, or apparatuses, or any suitable combination thereof. More specific examples of the machine-readable storage medium can include an electrical connection based on one or more lines, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage apparatus, a magnetic storage apparatus, or any suitable combination thereof.

To provide interaction with a user, the systems and techniques described here can be implemented on a computer. The computer can include a display device (e.g., a CRT (cathode ray tube) or an LCD (liquid crystal display) monitor) configured to display information to the user, and a keyboard and a pointing device (e.g., a mouse or trackball). The user can provide the input to the computer through the keyboard and the pointing device. Another type of device can be configured to provide an interaction with the user. For example, the feedback provided to the user can be any type of sensory feedback (e.g., visual feedback, auditory feedback, or tactile feedback). The input from the user can be received in any form (including acoustic input, voice input, or tactile input).

The systems and techniques described here can be implemented in a computation system including a background component (e.g., used as a data server), or a computation system (e.g., an application server) including a middleware component, or a computation system including a front-end component (e.g., a user computer having a graphical user interface or a web browser, the user can interact with implementations of the systems and techniques described here by the graphical user interface or the web browser), or in any combination of such background components, middleware components, or front-end components. The components of the system can be interconnected by any form or medium of digital data communication (e.g., a communication network). Examples of communication networks can include a local area network (LAN), a wide area network (WAN), and the Internet.

The computer system can include a client end and a server. The client end and the server are generally away from each other and typically interact through a communication network. The client end-server relationship can be generated by computer programs running on the corresponding computers and having the client end-server relationship with each other. The server can be a cloud server, a server of a distributed system, or a server incorporating a blockchain.

The steps can be rearranged, increased, or deleted by using the various forms of processes above. For example, the steps described in the present disclosure can be executed in parallel or in a different order, as long as the results expected by the technical solutions disclosed in the present disclosure can be implemented, which is not limited here.

In addition, the terms "first" and "second" are used for descriptive purposes only and cannot be understood as indicating or implying relative importance or implicitly indicating the number of indicated technical features. Thus, the features defined with "first" and "second" can explicitly or implicitly include at least one of the features. In the description of the present disclosure, "a plurality of" means two or more, unless specifically defined otherwise.

The above are merely specific embodiments of the present disclosure. However, the scope of the present disclosure is not limited to this. Those skilled in the art can easily think of modifications or replacements within the technical scope of the present disclosure. The modifications and replacements can be covered within the scope of the present disclosure. Therefore, the scope of the present disclosure shall be subject to the scope of the claims.

What is claimed is:

1. An object positioning method comprising:
   obtaining an environment image collected by a target object through a camera of the target object and a camera parameter of collecting the environment image;
   determining candidate position information of the target object and a virtual camera parameter, the virtual camera parameter and the camera parameter of the environmental image having a first correspondence;
   rendering, based on a predetermined three-dimensional model, the candidate position information, and the virtual camera parameter, to generate a rendered image corresponding to the candidate position information, the three-dimensional model and a real space having a second correspondence; and
   determining current moment position information of the target object based on the environment image, the rendered image, and the candidate position information, including:
      comparing the environmental image and the rendered image; and
      in response to the environment image and the rendered image being determined to satisfy a predetermined condition, determining the candidate position information to be the current moment position information of the target object.

2. The method according to claim 1, wherein determining the candidate position information of the target object includes:
   obtaining first moment position information of the target object at a first moment, the first moment being a moment before a current moment; and
   determining the candidate position information of the target object based on the first moment position information.

3. The method according to claim 2, wherein determining the candidate position information of the target object based on the first moment position information includes:
   obtaining first movement speed information of the target object;
   calculating a movement distance of the target object based on the first moving speed information and time difference information between the current moment and the first moment;
   predicting the current moment position information of the target object at the current moment based on the first moment position information and the movement distance of the target object as the candidate position information of the target object.

4. The method according to claim 1, wherein determining the current moment position information of the target object based on the environment image, the rendered image, and the candidate position information includes:
   in response to the environment image and the rendered image not satisfying the predetermined condition, calculating position deviation information based on the environment image and the rendered image, updating the candidate position information based on the position deviation information, returning to obtaining the environment image collected by the target object through the camera of the target object and the camera parameter of collecting the environment image until the environment image and the rendered image are determined to satisfy the predetermined condition, and then determining the updated candidate position information to be the current moment position information of the target object.

5. The method according to claim 4, wherein:
   the position deviation information includes time information of the target object collecting a next frame of the environment image;
   after updating the candidate position information based on the position deviation information, in response to the time information, the target object re-collects the environment image through the camera of the target object.

6. The method of claim 4, further comprising, before comparing the environment image and the rendered image:
   determining a model parameter corresponding to the candidate position information in the three-dimensional model; and
   processing the environmental image based on the model parameter.

7. The method according to claim 1, further comprising, after determining the current moment position information of the target object based on the environment image, the rendered image, and the candidate position information:
   obtaining second movement speed information of the target object;
   predicting second moment position information of the target object at a second moment based on the current moment position information of the target object and the second movement speed information as candidate position information of the second moment, the second moment being a moment after the current moment; and
   rendering, based on the predetermined three-dimensional model, the candidate position information at the second moment, and the virtual camera parameter, to generate a rendered image corresponding to the candidate position information at the second moment to generate the rendered image corresponding to the candidate position information at the second moment in advance.

8. The method according to claim 1, further comprising, after determining the current moment position information of the target object based on the environment image, the rendered image, and the candidate position information:
   determining difference information of the three-dimensional model relative to the real space based on the environment image and the rendered image; and
   updating the three-dimensional model based on the difference information.

9. The method according to claim 1,
   wherein the target object includes a plurality of cameras arranged at different directions;
   the method further comprising, after determining the candidate position information of the target object:
      determining a model parameter corresponding to the candidate position information in the three-dimensional model; and
      selecting, based on the model parameter, an environment image collected by a camera in a target direction and the camera parameter of collecting the environment image to be used to determine the current moment position information of the target object.

10. An electronic apparatus comprising:
a processor; and
a memory communicatively coupled to the processor and storing instructions that, when executed by the processor, cause the processor to:
obtain an environment image collected by a target object through a camera of the target object and a camera parameter for collecting the environment image;
determine candidate position information of the target object and a virtual camera parameter, the virtual camera parameter and the camera parameter of the environmental image having a first correspondence;
render, based on a predetermined three-dimensional model, the candidate position information, and the virtual camera parameter, to generate a rendered image corresponding to the candidate position information, the three-dimensional model and a real space having a second correspondence; and
determine current moment position information of the target object based on the environment image, the rendered image, and the candidate position information, including:
comparing the environmental image and the rendered image; and
in response to the environment image and the rendered image being determined to satisfy a predetermined condition, determining the candidate position information to be the current moment position information of the target object.

11. The electronic apparatus according to claim 10, wherein the processor is further configured to:
obtain first moment position information of the target object at a first moment, the first moment being a moment before a current moment; and
determine the candidate position information of the target object based on the current moment position information at the first moment.

12. The electronic apparatus according to claim 11, wherein the processor is further configured to:
obtain first movement speed information of the target object;
calculate a movement distance of the target object based on the first moving speed information and time difference information between the current moment and the first moment; and
predict the current moment position information of the target object at the current moment based on the first moment position information and the movement distance of the target object as the candidate position information of the target object.

13. The electronic apparatus according to claim 10, wherein the processor is further configured to:
in response to the environment image and the rendered image not satisfying the predetermined condition, calculate position deviation information based on the environment image and the rendered image, update the candidate position information based on the position deviation information, return to obtaining the environment image collected by the target object through the camera of the target object and the camera parameter of collecting the environment image until the environment image and the rendered image are determined to satisfy the predetermined condition, and then determine the updated candidate position information to be the current moment position information of the target object.

14. The electronic apparatus according to claim 13, wherein:
the position deviation information includes time information of the target object collecting a next frame of the environment image;
after updating the candidate position information based on the position deviation information, in response to the time information, the target object re-collects the environment image through the camera of the target object.

15. The electronic apparatus of claim 13, wherein the processor is further configured to:
determine a model parameter corresponding to the candidate position information in the three-dimensional model; and
process the environmental image based on the model parameter.

16. The electronic apparatus according to claim 10, wherein the processor is further configured to:
obtain second movement speed information of the target object;
predict second moment position information of the target object at a second moment based on the current moment position information of the target object and the second movement speed information as candidate position information of the second moment, the second moment being a moment after the current moment; and
render, based on the predetermined three-dimensional model, the candidate position information at the second moment, and the virtual camera parameter, to generate a rendered image corresponding to the candidate position information at the second moment to generate the rendered image corresponding to the candidate position information at the second moment in advance.

17. The electronic apparatus according to claim 10, wherein the processor is further configured to:
determine difference information of the three-dimensional model relative to the real space based on the environment image and the rendered image; and
update the three-dimensional model based on the difference information.

18. The electronic apparatus according to claim 10, wherein:
the target object includes a plurality of cameras arranged at different directions; and
the processor is further configured to:
determine a model parameter corresponding to the candidate position information in the three-dimensional model; and
select, based on the model parameter, an environment image collected by a camera in a target direction and the camera parameter of collecting the environment image to be used to determine the current moment position information of the target object.

19. A non-transitory computer-readable storage medium storing computer instructions that, when executed by a processor, cause the processor to:
obtain an environment image collected by a target object through a camera of the target object and a camera parameter for collecting the environment image;
determine candidate position information of the target object and a virtual camera parameter, the virtual camera parameter and the camera parameter of the environmental image having a first correspondence;
render, based on a predetermined three-dimensional model, the candidate position information, and the virtual camera parameter, to generate a rendered image corresponding to the candidate position information, the three-dimensional model and a real space having a second correspondence; and determine current moment position information of the target object based on the environment image, the rendered image, and the candidate position information, including:

comparing the environmental image and the rendered image; and in response to the environment image and the rendered image being determined to satisfy a predetermined condition, determining the candidate position information to be the current moment position information of the target object.

20. The storage medium according to claim 19, wherein the processor is further configured to:

obtain first moment position information of the target object at a first moment, the first moment being a moment before a current moment; and determine the candidate position information of the target object based on the first moment position information.

\* \* \* \* \*